Figure 1:
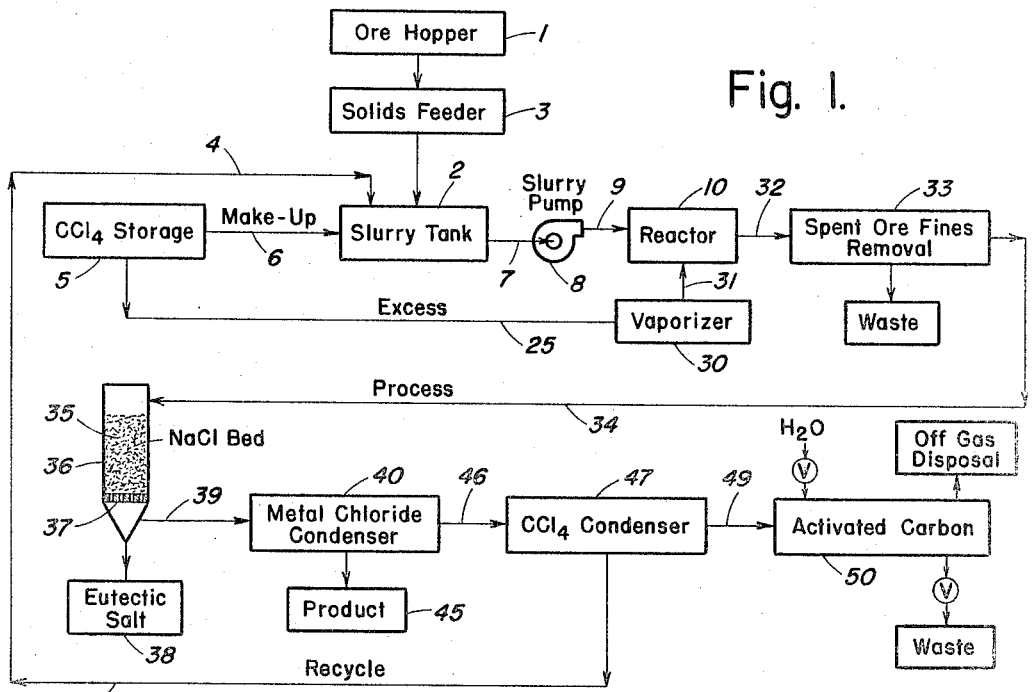

Feb. 21, 1967  R. L. McBRAYER  3,305,300
CARBON TETRACHLORIDE ORE CHLORINATION PROCESS
Filed Oct. 3, 1962

INVENTOR
Robert L. McBrayer
BY
Bernhard A. Lurick
ATTORNEY 3,305,300
CARBON TETRACHLORIDE ORE
CHLORINATION PROCESS
Robert L. McBrayer, Lincoln Park, Mich., assignor to Wyandotte Chemicals Corporation, Wyandotte, Mich., a corporation of Michigan
Filed Oct. 3, 1962, Ser. No. 228,196
18 Claims. (Cl. 23—15)

This invention relates to the chlorination of refractory metal oxide ores and particularly oxide ores of a refractory metal selected from the group consisting of niobium, tantalum, molybdenum and tungsten.

Halogenation processes have long been employed to form halogen compounds with metals in ores and concentrates. In these processes, ores or concentrates are commonly supplied to a reaction chamber with the halogenation agent, where, at elevated temperatures, gaseous metal halides are formed.

In accordance with prior art practice, the finely divided ore is either pelletized using a suitable binder or is fluidized by the upward passage of the gaseous chlorinating agent through the finely divided ore. Where the ore is pelletized, chlorination is carried out in a vertical shaft-type furnace by passing the chlorinating agent, generally chlorine, through a fixed bed of pellets. This practice possesses certain inherent disadvantages with regard to reduction efficiency and heat requirements. Where pellets are employed, it is difficult to remove the last five to ten percent of the metal values from some ores except by a prolonged retention time or the addition of inert materials to increase their porosity. Where the chlorinating agent is chlorine, a high temperature in the neighborhood of 700° C. is generally required, which in turn has the disadvantages of requiring high amounts of heat input and expensive heat resisting materials. In addition, such high temperatures tend to increase corrosion rates in the reaction chamber.

Where a fluidized bed of the ore is employed and the chlorinating agent is carbon tetrachloride vapor, this vapor is passed upward through the bed of the ore at a sufficient rate to fluidize the ore particles. This has certain inherent disadvantages in that it requires a substantial amount of heat to vaporize the carbon tetrachloride sufficiently to provide a stream of adequate volume and velocity to fluidize the finely divided ore. In addition, a large excess of the carbon tetrachloride over the amount required to completely reduce the ore is necessary simply to have enough vapor for fluidization. While an inert gas may be mixed with the chlorinating agent to provide a rate of flow sufficient to fluidize the particles of ore, the use of an inert gas has inherent disadvantages since it requires either large quantities of the inert gas which is expensive or necessitates separating the inert gas from the other gases resulting from the reaction, thus requiring expensive separation equipment. In addition, a fluid bed operation requires very close control of all operating variables, particularly the particle sizes and proportions of various particle sizes. Accordingly, it is the purpose of this invention to provide a method of chlorinating refractory metal oxide ores wherein high reduction efficiencies are obtained, the amount of excess chlorinating agent required is substantially reduced without the addition of an inert gas to the chlorinating agent stream, and wherein preheating of the chlorinating agent, excessively high reaction temperatures and close control of operating variables are not required.

Figure 2:
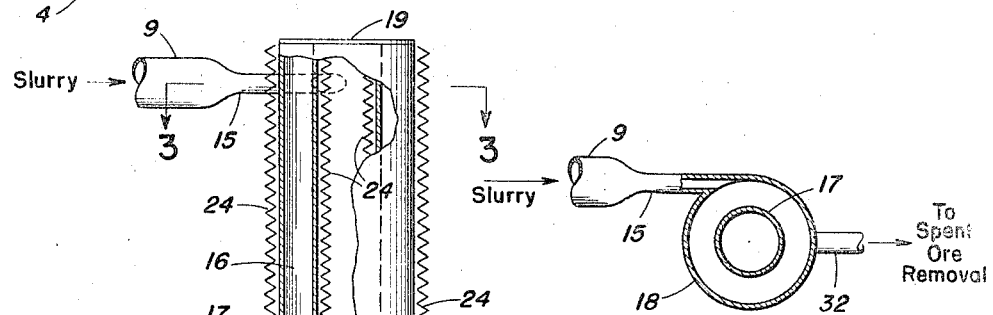
Figure 3:
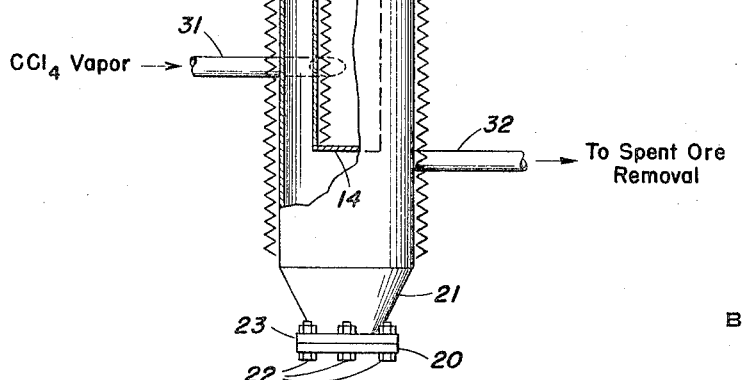

This invention is best described with reference to the attached drawings wherein:

FIGURE 1 is a flow sheet illustrating a preferred practice of the present invention, FIGURE 2 is a diagrammatic drawing, partly in section, of a preferred reactor for chlorinating the refractory metal oxide ores in accordance with principles embodying this invention, and FIGURE 3 is a plan view of the reactor of FIGURE 2, in section, taken along the line 3—3 of FIGURE 2.

With reference now more particularly to FIGURE 1, it will be seen that an oxide ore of a refractory metal, particularly those selected from the group consisting of niobium, tantalum, molybdenum and tungsten is fed from a suitable container such as an ore hopper 1 into a suitable container such as a tank 2 by means such as a conventional mechanical feeder 3, all of which are well known to those skilled in the art. The tank 2 contains carbon tetrachloride which is applied to the tank both by recycling through conduit 4 and from a suitable storage tank 5 for supplying make-up carbon tetrachloride through conduit 6. In accordance with this invention, the particles of ore are ground to 100% minus 100 U.S. standard mesh and finer, with finer material preferred. Material of such particle size is essential in order to obtain proper action between the ore particles and the carbon tetrachloride and in order to permit entrainment of the ore particles with vaporized carbon tetrachloride. The ore particles are mixed with the carbon tetrachloride in the slurry tank 2 with the amount of carbon tetrachloride being sufficient to entrain the particles upon vaporization of the slurry. For greatest efficiency a maximum amount of 50% solids by weight in the slurry is preferred. The slurry is then withdrawn from tank 2 through conduit 7 by means of slurry pump 8 and forced by means of the slurry pump through conduit 9 into reactor 10.

With reference now more particularly to FIGURE 2, the slurry is forced through a restriction 15 in conduit 9 or a conventional nozzle in order to spray the slurry into reactor 10. The slurry is forced through the restriction or nozzle tangentially into the reaction zone which is in the form of an annular space 16 defined by the two concentric cylindrical surfaces of tubular members 17 and 18 of differing diameters. The smaller diameter member 17 is concentrically disposed within the larger diameter 18 to define the annular space 16 therebetween. The smaller diameter member is shorter than the larger diameter member. The reaction zone is also defined by two spaced parallel plane surfaces transverse to the axis of the cylindrical surfaces or tubular members 17 and 18 which generally comprise metal plates 19 and 20 provided at the ends of the reactor 10, thereby completing the reactor enclosure. The ends of the tubular members are coplanar at the upper or inlet end of the reactor and end plate 19 is affixed to the upper ends of the tubular members 17 and 18 by suitable means such as welding. The lower end of of tubular member 17 is closed by a plate 14 affixed thereto by suitable means such as welding. The lower end of the reactor 10 is provided with a conical portion 21 to collect any spent ore fines which are not entrained in the gaseous mixture. These fines may be removed periodically by removing the plate 20 which is affixed to the bottom of the reactor 10 by means of bolt and nut assemblies 22 passing through plate 20 and a flange 23 affixed to the bottom of the reactor by suitable means such as welding.

The reaction zone is heated preferably to a temperature greater than 400° C. by suitable heating means provided on the inside of tubular member 17 and on the outside of tubular member 18. Conventional electrical resistance-type heater elements indicated diagrammatically at 24 and well known to those skilled in the art are preferred. The outside of reactor 10 can be covered with conventional insulation material (not shown) and/or a heat reflecting sheet (not shown) surrounding the outer electric resistance heating element 24 to prevent heat loss. Although temperatures higher than 400° C. may be employed, it is desirable that the reaction temperatures be kept as low as possible consistent with good extraction of the metal chloride from the ore. Higher temperatures not only have the disadvantages mentioned above in the introductory portion of this application but, also, they may promote undesirable side reactions of carbon tetrachloride with other constituents which would consume additional reagent.

In the reaction zone or space 16 the slurry reacts under the influence of the heat at a temperature greater than 400° C. to produce a gaseous mixture comprising the chloride and oxychloride of the refractory metal and impurities including spent ore fines, iron chloride and excess carbon tetrachloride plus small amounts of phosgene, carbon monoxide and carbon dioxide. Additional carbon tetrachloride is added in the end of reaction zone or space 16 opposite that at which the slurry enters, the additional carbon tetrachloride being supplied from storage tank 5 through conduit 25 and a vaporizer 30. Vaporizer 30 is a conventional vaporizing apparatus and may comprise a container heated by suitable means such as electrical resistance elements. The vaporized carbon tetrachloride then enters the reactor 10 through conduit 31. The additional carbon tetrachloride enters the reaction zone tangentially through the conduit 31 which as shown in FIGURES 2 and 3 is directly below conduit 9 and thus only the upper conduit 9 shows in the plan view of the reactor, i.e., FIGURE 3. The additional carbon tetrachloride reacts with the oxychloride to form the chloride of the refractory metal and thus eliminates the oxychloride. In a preferred embodiment of this invention, the amount of additional carbon tetrachloride ranges from about one-third to two-thirds the total amount of carbon tetrachloride supplied to the reaction zone.

The gaseous mixture comprising the refractory metal chloride and impurities including spent ore fines, iron chloride, excess carbon tetrachloride and small amounts of the other impurities listed above is withdrawn from the reactor 10 through conduit 32 and passed through a separating device 33 for separating the spent ore fines from the gaseous mixture. This separating device may be a conventional cyclone separator or a conventional electrostatic precipitator which is heated by suitable means such as electrical resistances to a temperature in excess of the condensation temperature of the desired product. Since these devices are well known to those skilled in the art, a detailed description need not be provided. The treated gaseous mixture from separating device 33 is passed through conduit 34 and then through a bed of sodium chloride 35 provided in a suitable container which may be tubular and supported on a porous filter or screen 37 in the lower portion of the container 36. A collecting container 38 is connected to the bottom of the container 36 and a suitable conical bottom is provided in container 36 below filter or screen 37 to funnel liquid material into the container. The gaseous mixture enters the salt bed 35 through conduit 34, passes down through the salt bed which is maintained at a temperature of at least 300° C. by suitable heating means such as electrical resistance elements (not shown) through the filter 37 and out through conduit 39. In passing through the salt bed 35, the sodium chloride reacts with the iron chloride to form a liquid eutectic salt, $FeNaCl_4$. The liquid eutectic salt flows through the filter 37 and down into the container 38. The gaseous mixture leaving through conduit 39 is now free from spent ore fines and iron chloride. This gaseous mixture is then passed through a condenser 40 for separating the pure refractory metal chloride from the gaseous mixture by condensing the pure metal chloride. Condenser 40 may be simply a metal cylinder surrounded by air at room temperature. Fins may be affixed to the cylinder to increase the surface area or cooling coils having water circulated therein may be provided around the sides of the box. It is preferred to condense at a temperature range of from about 140°–150° C. In this temperature range, the refractory metal chloride condenses while the impurities all remain in the gaseous state. The pure refractory metal chloride condenses as a snow or solid which is collected in a suitable container indicated at 45.

The gaseous mixture containing excess carbon tetrachloride plus the impurities is then passed through conduit 46 into another condenser 47 which may be a shell and tube-type condenser to condense the excess carbon tetrachloride as a liquid in order to separate it from the gaseous mixture. The temperature in this second condenser is maintained at less than 76° C. in order to condense the carbon tetrachloride. The lower limit for the temperature is not too important. However, since water is generally the most convenient cooling medium, the temperature generally would not be below that of the available water supply. The carbon tetrachloride which is condensed is then recycled through conduit 4 to the slurry tank for mixing with the ore particles.

The apparatus for practicing the above-described method steps should be of suitable corrosion-resistant materials such as glass, glass-lined metal and suitable corrosion-resistant metals such as a high nickel, chromium, iron alloy.

The remaining gaseous mixture from the condenser contains only impurities and may be disposed of as waste through conduit 49. If the waste gas is to be passed to the atmosphere, it is necessary to remove the phosgene contained therein due to its high toxicity.

A preferred method for removing or separating phosgene from the gaseous mixture involves the preferential adsorption of the phosgene on the surface of activated carbon by passing the gaseous mixture through a bed 50 of activated carbon. It is to be understood that the words "adsorption" and "adsorbed" as used herein also include the effects resulting from absorption. Activated carbon is a well known, readily available material and numerous descriptions of its preparation are given in the literature. Literature references which adequately describe the preparation of the activated carbon used in this invention may be found in "Industrial Chemistry," by E. R. Riegel, 3rd edition, p. 589 (1937) or in "Industrial Chemistry of Colloidal and Amorphous Materials," by Lewis, Squires and Broughton (1943), pp. 74 and 75. The preparation of activated carbon consists essentially of removing adsorbed hydrocarbons from a porous amorphous-base carbon which is usually obtained by simple low-temperature distillation of a carbon-containing material, such as nutshells or wood. The removal of adsorbed hydrocarbons is usually accomplished by a combined oxidation and distillation involving the use of steam or the use of steam and air. The carbon that results from this treatment is of extremely high surface area.

Although phosgene is readily adsorbed on dry activated carbon, the capacity of the mass or bed of carbon may be increased through the use of water on the carbon. For example, the gaseous mixture may be passed upward through a carbon filled column down which water is flowing. Under such circumstances, phosgene is removed not only by adsorption by the activated carbon but also through the reaction: $COCl_2 + 2H_2O \rightarrow 2HCl + H_2CO_3$. This method has certain inherent disadvantages, however, due to the necessity for countercurrent flow of phosgene and water which results in complex piping and a need for controls for such flows, with the attendant increase in labor and capital expenses. For example, if the gaseous mixture flow should increase, the operation of the column might be disturbed unless the rate of flow of the counter-current water is adjusted. Accordingly, it is preferred to pass the gaseous mixture through a chamber, fabricated from a suitable corrosion-resistant material such as carbon which has been treated to become impervious to gases, containing a mass or bed of activated carbon which is moist or contains some water vapor but where there is no flow of water through the column. The moisture present on the carbon has the effect of removing phosgene by the above-recited reaction and thus increases the capacity of the mass of carbon for removing phosgene. The phosgene-free gaseous mixture passes out of the top of the column or chamber. The above process is carried out initially at room temperature. However, the heat of adsorption plus that of the above reaction generally raises the temperature of the bed above 180° F. Since the only flow involved in this method during the actual adsorption is the flow of the gaseous mixture itself, this method can handle surges in flow of gaseous mixture which might disturb operation of a column through which water was constantly flowing.

When the carbon bed is saturated with phosgene or when the efficiency of the carbon bed is reduced appreciably, due to the amount of adsorbed phosgene, the mass of activated carbon is washed with water which reacts with the adsorbed phosgene in accordance with the above reaction to form hydrochloric acid and carbonic acid which dissolve in the water, thus removing the phosgene and regenerating the activated carbon. The most effective method for accomplishing this is to flood the chamber or column with cold water for a period of time sufficient to remove the phosgene from the carbon. The water is then drained from the column and the carbon is again in condition to adsorb phosgene. This is greatly superior to the prior art methods wherein it was believed necessary to employ hot gases or steam for purging or regenerating the carbon bed since the necessity for heating is eliminated.

Where phosgene removal must be continuous, a pair of chambers or columns containing the moist activated carbon may be employed whereby one column or chamber may be regenerated, i.e. the phosgene removed by washing with water and, specifically, by flooding the column while the other is on stream adsorbing phosgene from the gaseous mixture. When the phosgene has been removed from the carbon in the one column and the carbon in the other approaches saturation or at least has its efficiency reduced due to the amount of phosgene which has already been adsorbed, the gas and water streams to the respective columns are reversed.

The following are examples illustrating the practice of this invention.

*Example I*

Niobium ore concentrate is ground to about 120 mesh. This ore has the following approximate analysis:

| | Wt., percent |
|---|---|
| $Nb_2O_5$ | 56.3 |
| $Ta_2O_5$ | 0.5 |
| $TiO_2$ | 7.5 |
| $SiO_2$ | 2.3 |
| $Fe_2O_3$ | 22.8 |

Remainder largely calcium and sodium salts.

This ore is added to a glass-lined agitated slurry tank of 15 gallons capacity at a rate of 60 pounds per hour. The ore is fed from an ore hopper into the tank by means of a conventional mechanical feeder. Recycled carbon tetrachloride is added to the ore in the slurry tank at a rate of 72 pounds per hour and make-up carbon tetrachloride is added to the slurry tank from a glass-lined storage tank at a rate of 37 pounds per hour to make up a slurry containing about 35% solids. The temperature in the slurry tank is about 20° C. The slurry is withdrawn from the slurry tank and forced by means of a stainless steel "progressing cavity" type slurry pump through a restriction in the conduit and sprayed tangentially into the reactor. The major portion of the conduit from the pump to the reactor is 0.782" inside diameter while 6" of the conduit just preceding the reactor is 0.365" inside diameter. The restriction is fabricated from tungsten. All conduits employed for transmitting fluids in this operation are fabricated from "Inconel" unless otherwise specified. "Inconel" is a high nickel, chromium, iron alloy. Wrought "Inconel" comprises 79.5% nickel, 13.0% chromium, 6.5% iron, 0.25% manganese, 0.25% silicon, 0.08% carbon and 0.20% copper. Cast "Inconel" comprises 77.75% nickel, 13.50% chromium, 6.00% iron and 0.25% silicon. The reactor is fabricated from "Inconel" and consists of an annular space defined by two concentric cylindrical surfaces of tubular members as shown in FIGURE 2. The inner tubular member is 1.05" outside diameter and 96" long while the outer tubular member is 3.068" inside diameter and 102" long. The conical portion is 8" long and reduces to 1.049" inside diameter. The slurry is pumped into the reactor at a rate of 0.17 gallon per minute. 4 gallons per hour of additional carbon tetrachloride are vaporized by heating to a temperature of 400° C. in a tubular vaporizer which consists of a 2.067" inside diameter "Inconel" pipe 24" long surrounded by electric resistance heating elements. The vapor flows from the vaporizer and enters the lower portion of the reactor tangentially. The reaction zone is heated to a temperature of 400° C. by electric resistance heating elements provided on the inside of the inner tubular member and on the outside of the outer tubular member. In the reactor, the slurry reacts to produce a gaseous mixture which includes niobium pentachloride. The gaseous mixture which leaves the lower portion of the reactor has the following approximate composition:

| | Wt., percent |
|---|---|
| $NbCl_5$ | 30.4 |
| Spent ore fines | 2.4 |
| $FeCl_3$ | 12.2 |
| $TaCl_5$ | <0.1 |
| $TiCl_4$ | 4.7 |
| Excess $CCl_4$ | 32.1 |
| $COCl_2$ | 5.5 |
| $CO_2$ | 9.0 |
| Miscellaneous volatile materials | 2.6 |

This gaseous mixture flows from the lower portion of the reactor as shown in FIGURE 2 and passes into an "Inconel" cyclone separator which is heated to a temperature of 400° C. wherein the spent ore fines are removed. The gaseous mixture is then passed through a bed of dry rock salt. The salt bed is contained in an "Inconel" tubular container 6" IPS, the depth of the salt bed is 24" and the temperature is maintained at 300° C. by electric resistance heating elements disposed around the outside of the tubular container. Sodium chloride in the bed reacts with the iron chloride in the gaseous mixture to form a liquid eutectic salt which flows through the filter and down into a container. The filter is fabricated from "Inconel" material and is in the form of a porous plate.

The iron chloride-free gaseous mixture then passes into the metal chloride condenser. This condenser comprises an "Inconel" box of 6" by 6" by 60" long with a hopper bottom 6" by 6" at the top and 6" deep with a 1" by 1" opening at the bottom which is closed by a sliding gate. The box is surrounded with cooling coils through which water passes. The water flow is controlled to maintain a temperature of 145° C. inside the condenser. The niobium pentachloride condenses in this condenser as a solid which is collected in the bottom of the condenser. The niobium pentachloride may be periodically removed through the gate in the bottom of the condenser. Approximately 68 pounds per hour of 99.5% pure niobium pentachloride is produced. About 99% of the available niobium in the ore is chlorinated. The remaining gaseous mixture from which the niobium pentachloride has been removed is passed to the shell side of an "Inconel" shell and tube-type condenser having 10 square feet of heat exchange surface wherein the excess carbon tetrachloride is condensed and recycled to the slurry tank. The gaseous mixture is cooled in the second condenser to a temperature of 38° C. by cold water flowing through the tubes of the heat exchanger. The remaining gaseous mixture is then passed through a gas-impervious fiberglass column 12" diameter and 96" long containing 190 pounds of activated carbon, which carbon contains a small amount of water vapor wherein the phosgene is removed, the remaining gaseous mixture passing to the atmosphere. Two such columns are employed wherein gas passes through one of the columns while the other column is flooded with water to remove the phosgene from the carbon. The streams to the columns are reversed every 30 minutes whereby the gas may be constantly treated. The off gas passing to the atmosphere contains less than 5 p.p.m. of phosgene.

*Example II*

Tantalum ore is ground to about 100 mesh. This ore has the following approximate analysis:

|  | Wt., percent |
|---|---|
| $Ta_2O_5$ | 65.3 |
| $Nb_2O_5$ | 9.7 |
| $TiO_2$ | 2.2 |
| $SnO_2$ | 1.1 |
| $Fe_2O_3$ | 19.3 |

This ore is added to a glass-lined agitated slurry tank of 15 gallons capacity at a rate of 70 pounds per hour. The ore is fed from an ore hopper into the tank by means of a conventional mechanical feeder. Recycled carbon tetrachloride is added to the ore in the slurry tank at a rate of 64 pounds per hour and makeup carbon tetrachloride is added to the slurry tank from a glass-lined storage tank at a rate of 35 pounds per hour to make up a slurry containing about 41% solids. The temperature in the slurry tank is about 20° C. The slurry is withdrawn from the slurry tank and forced by means of a stainless steel "progressing cavity" type slurry pump through a restriction in the conduit and sprayed tangentially into the reactor. The major portion of the conduit from the pump to the reactor is 0.782" inside diameter while 6" of the conduit just preceding the reactor is 0.365" inside diameter. The restriction is fabricated from tungsten. All conduits employed for transmitting fluids in this operation are fabricated from "Inconel" unless otherwise specified. "Inconel" is a high nickel, chromium, iron alloy. Wrought "Inconel" comprises 79.5% nickel, 13.0% chromium, 6.5% iron, 0.25% manganese 0.25% silicon, 0.08% carbon and 0.20% copper. Cast "Inconel" comprises 77.75% nickel, 13.50% chromium, 6.00% iron and 0.25% silicon. The reactor is fabricated from "Inconel" and takes the form of an annular space defined by two concentric cylindrical surfaces of tubular members as shown in FIGURE 2. The inner tubular member is 1.05" outside diameter and 96" long while the outer tubular member is 3.068" inside diameter and 102" long. The conical portion is 8" long and reduces to 1.049" inside diameter. The slurry is pumped into the reactor at a rate of 0.14 gallon per minute. 3.5 gallons per hour of additional carbon tetrachloride are vaporized by heating to a temperature of 400° C. in a tubular vaporizer which consists of a 2.067" I.D. "Inconel" pipe 24" long surrounded by electric resistance heating elements. The vapor flows from the vaporizer and enters the lower portion of the reactor tangentially. The reaction zone is heated to a temperature of 400° C. by electric resistance heating elements provided on the inside of the inner tubular member and on the outside of the outer tubular member. In the reactor, the slurry reacts to produce a gaseous mixture which includes tantalum pentachloride. The gaseous mixture which leaves the lower portion of the reactor has the following approximate composition:

|  | Wt., percent |
|---|---|
| $NbCl_5$ | 6.3 |
| Spent ore fines | 1.1 |
| $FeCl_3$ | 12.6 |
| $TaCl_5$ | 34.5 |
| $TiCl_4$ | 1.6 |
| Excess $CCl_4$ | 29.6 |
| $COCl_2$ | 5.8 |
| $CO_2$ | 8.3 |
| Miscellaneous volatile materials | 0.6 |

This gaseous mixture flows from the lower portion of the reactor as shown in FIGURE 2 and passes into an "Inconel" cyclone separator which is heated to a temperature of 400° C. wherein the spent ore fines are removed. The gaseous mixture is then passed through a bed of dry rock salt. The salt bed is contained in an "Inconel" tubular container 6" IPS, the depth of the salt bed is 24" and the temperature is maintained at 300° C. by electric resistance heating elements disposed around the outside of the tubular container. Sodium chloride in the bed reacts with the iron chloride in the gaseous mixture to form a liquid eutectic salt which flows through the filter and down into a container. The filter is fabricated from "Inconel" material and is in the form of a porous plate.

The iron chloride-free gaseous mixture then passes into the metal chloride condenser. This condenser comprises an "Inconel" box of 6" by 6" by 60" long with a hopper bottom 6" by 6" at the top and 6" deep with a 1" by 1" opening at the bottom which is closed by a sliding gate. The box is surrounded with cooling coils through which water passes. The water flow is controlled to maintain a temperature of 145° C. inside the condenser. The tantalum pentachloride condenses in this condenser as a solid which is collected in the bottom of the condenser. The tantalum pentachloride may be periodically removed through the gate in the bottom of the condenser. Approximately 87 pounds per hour of 84.5% pure tantalum pentachloride (remainder $CbCl_5$) is produced. About 99% of the available tantalum in the ore is chlorinated. The remaining gaseous mixture from which the tantalum pentachloride has been removed is passed to the shell side of an "Inconel" shell and tube-type condenser having 10 square feet and heat exchange surface wherein the excess carbon tetrachloride is condensed and recycled to the slurry tank. The gaseous mixture is cooled in the second condenser to a temperature of 38° C. by cold water flowing through the tubes of the heat exchanger. The remaining gaseous mixture is then passed through a gas-impervious fiberglass column 12" diameter and 96" long containing 190 pounds of activated carbon, which carbon contains a small amount of water vapor wherein the phosgene is removed, the remaining gaseous mixture passing to the atmosphere. Two such columns are employed wherein gas passes through one of the columns while the other column is flooded with water to remove the phosgene from the carbon. The streams to the columns are reversed every 30 minutes whereby the gas may be constantly treated. The off gas passing to the atmosphere contains less than 5 p.p.m. of phosgene.

*Example III*

Tungsten ore is ground to about 120 mesh. This ore has the following approximate analysis:

|  | Wt., percent |
|---|---|
| $WO_3$ | 74.5 |
| $CaO$ | 17.5 |
| $Fe_2O_3$ | 1.3 |
| $SnO_2$ | 2.1 |
| $MnO_2$ | .7 |
| $SiO_2$ | 2.3 |

This ore is added to a glass-lined agitated slurry tank of 15 gallons capacity at a rate of 60 pounds per hour. The ore is fed from an ore hopper into the tank by means of a conventional mechanical feeder. Recycled carbon tetrachloride is added to the ore in the slurry tank at a rate of 74 pounds per hour and make-up carbon tetrachloride is added to the slurry tank from a glass-lined storage tank at a rate of 40 pounds per hour to make up a slurry containing about 35% solids. The temperature in the slurry tank is about 20° C. The slurry is withdrawn from the slurry tank and forced by means of a stainless steel "progressing cavity" type slurry pump through a restriction in the conduit and sprayed tangentially into the reactor. The major portion of the conduit from the pump to the reactor is 0.782″ inside diameter while 6″ of the conduit just preceding the reactor is 0.365″ inside diameter. The restriction is fabricated from tungsten. All conduits employed for transmitting fluids in this operation are fabricated from "Inconel" unless otherwise specified. "Inconel" is a high nickel, chromium, iron alloy. Wrought "Inconel" comprises 79.5% nicel, 13.0% chromium, 6.5% iron, 0.25% manganese, 0.25% silicon, 0.08% carbon and 0.20% copper. Cast "Inconel" comprises 77.75% nickel, 13.50% chromium, 6.00% iron and 0.25% silicon. The reactor is fabricated from "Inconel" and takes the form of an annular space defined by two concentric cylindrical surfaces of tubular members as shown in FIGURE 2. The inner tubular member is 1.05″ outside diameter and 96″ long while the outer tubular member is 3.068″ inside diameter and 102″ long. The conical portion is 8″ long and reduces to 1.049″ inside diameter. The slurry is pumped into the reactor at a rate of 0.165 gallon per minute. 4 gallons per hour of additional carbon tetrachloride are vaporized by heating to a temperature of 400° C. in a tubular vaporizer which conssits of a 2.067″ I.D. "Inconel" pipe 24″ long surrounded by electric resistance heating elements. The vapor flows from the vaporizer and enters the lower portion of the reactor tangentially. The reaction zone is heated to a temperature of 450° C. by electric resistance heating elements provided on the inside of the inner tubular member and on the outside of the outer tubular member. In the reactor, the slurry reacts to produce a gaseous mixture which includes tungsten hexachloride. The gaseous mixture which leaves the lower portion of the reactor has the following approximate composition:

| | Wt., percent |
|---|---|
| $WCl_6$ | 32.8 |
| Spent ore fines | 9.2 |
| $FeCl_3$ | 0.1 |
| Excess $CCl_4$ | 32.2 |
| $COCl_2$ | 16.3 |
| $CO_2$ | 4.7 |
| Miscellaneous volatile materials | 4.7 |

This gaseous mixture flows from the lower portion of the reactor as shown in FIGURE 2 and passes into an "Inconel" cyclone separator which is heated to a temperature of 400° C. wherein the spent ore fines are removed. The gaseous mixture is then passed through a bed of dry rock salt. The salt bed is contained in an "Inconel" tubular container 6″ IPS, the depth of the salt bed is 24″ and the temperature is maintained at 300° C. by electric resistance heating elements disposed around the outside of the tubular container. Sodium chloride in the bed reacts with the iron chloride in the gaseous mixture to form a liquid eutectic salt which flows through the filter and down into a container. The filter is fabricated from "Inconel" material and is in the form of a porous plate.

The iron chloride-free gaseous mixture then passes into the metal chloride condenser. This condenser comprises an "Inconel" box of 6″ by 6″ by 60″ long with a hopper bottom 6″ by 6″ at the top and 6″ deep with a 1″ by 1″ opening at the bottom which is closed by a sliding gate. The box is surrounded with cooling coils through which water passes. The water flow is controlled to maintain a temperature of 145° C. inside the condenser. The tungsten hexachloride condenses in this condenser as a solid which is collected in the bottom of the condenser and may be periodically removed through the gate in the bottom of the condenser. Approximately 75 pounds per hour of 99.5% pure tungsten hexachloride is produced. About 99% of the available tungsten in the ore is chlorinated. The remaining gaseous mixture from which the tungsten hexachloride has been removed is passed to the shell side of an "Inconel" shell and tube-type condenser having 10 square feet and heat exchange surface wherein the excess carbon tetrachloride is condensed and recycled to the slurry tank. The gaseous mixture is cooled in the second condenser to a temperature of 38° C. by cold water flowing through the tubes of the heat exchanger. The remaining gaseous mixture is then passed through a gas-impervious fiberglass column 12″ diameter and 96″ long containing 190 pounds of activated carbon, which carbon contains a small amount of water vapor wherein the phosgene is removed, the remaining gaseous mixture passing to the atmosphere. Two such columns are employed wherein gas passes through one of the columns while the other column is flooded with water to remove the phosgene from the carbon. The streams to the columns are reversed every 15 minutes whereby the gas may be constantly treated. The off gas passing to the atmosphere contains less than 5 p.p.m. of phosgene.

While there has been shown and described hereinabove the preferred embodiments of this invention, it is to be understood that various changes, alterations and modifications can be made thereto without departing from the spirit and scope thereof as defined in the appended claims.

I claim:
1. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry and forcing said slurry into a reaction zone in the form of an annular space defined by two concentric cylindrical surfaces, said reaction zone being maintained at a temperature greater than 400° C.

2. The method of claim 1 wherein said refractory metal is niobium.

3. The method of claim 1 wherein said refractory metal is tantalum.

4. The method of claim 1 wherein said refractory metal is molybdenum.

5. The method of claim 1 wherein said refractory metal is tungsten.

6. The method of claim 1 wherein the maximum amount of solids in the slurry is 50% by weight.

7. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry, forcing said slurry tangentially into one end of a reaction zone in the form of an annular space defined by two concentric cylindrical surfaces, said reaction zone being maintained at a temperature greater than 400° C., and adding additional carbon tetrachloride in the end of said reaction zone opposite that at which said slurry enters.

8. The method of claim 7 wherein the maximum amount of solids contained in said slurry is 50% by weight and wherein the amount of said additional carbon tetrachloride is from about one-third to two-thirds of the total carbon tetrachloride supplied to the reaction zone.

9. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry and forcing said slurry into a heated chamber maintained at a temperature greater than 400° C., said slurry reacting at said temperature in said chamber to produce a gaseous mixture comprising refractory metal chloride and impurities including spent ore fines, iron chloride and excess carbon tetrachloride, withdrawing said gaseous mixture from said chamber, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride, withdrawing said gaseous mixture from said bed of sodium chloride and separating the pure refractory metal chloride from said gaseous mixture by condensing the pure metal chloride in a condensing zone.

10. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry and forcing said slurry into a heated chamber maintained at a temperature greater than 400° C., said slurry reacting at said temperature in said chamber to produce a gaseous mixture comprising refractory metal chloride and impurities including spent ore fines, iron chloride and excess carbon tetrachloride, withdrawing said gaseous mixture from said chamber, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride, withdrawing said gaseous mixture from said bed of sodium chloride and separating the pure refractory metal chloride from said gaseous mixture by condensing the pure metal chloride in a condensing zone at a temperature of 140–150° C., withdrawing said gaseous mixture from said first condensing zone and separating excess carbon tetrachloride from said gaseous mixture by condensing the excess carbon tetrachloride in a second condensing zone maintained at a temperature less than 76° C., recycling the excess carbon tetrachloride and removing the gaseous mixture containing remaining impurities from the system.

11. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry and forcing said slurry into a heated chamber maintained at a temperature greater than 400° C., said slurry reacting at said temperature in said chamber to produce a gaseous mixture comprising refractory metal chloride and impurities including spent ore fines, iron chloride, excess carbon tetrachloride and phosgene, withdrawing said gaseous mixture from said chamber, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride, withdrawing said gaseous mixture from said bed of sodium chloride and separating the pure refractory metal chloride from said gaseous mixture by condensing the pure metal chloride in a condensing zone at a temperature of 140°–150° C., withdrawing said gaseous mixture from said first condensing zone and separating excess carbon tetrachloride from said gaseous mixture by condensing the excess carbon tetrachloride in a second condensing zone maintained at a temperature less than 76° C., recycling the excess carbon tetrachloride, separating phosgene from the gaseous mixture by contacting the gaseous mixture with activated carbon to effect preferential adsorption of the phosgene by the activated carbon, subsequently removing phosgene from the carbon by washing the carbon with water and removing the gaseous mixture containing remaining impurities from the system.

12. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry, the amount of carbon tetrachloride being sufficient to entrain said particles upon vaporization of said slurry and forcing said slurry tangentially into one end of a reaction zone in the form of an annular space defined by two concentric cylindrical surfaces, said reaction zone being maintained at a temperature greater than 400° C., said slurry reacting at said temperature in said reaction zone to produce a gaseous mixture comprising the refractory metal chloride and oxychloride and impurities including spent ore fines, iron chloride and excess carbon tetrachloride, adding additional carbon tetrachloride into the end of said reaction zone opposite that at which said slurry enters, said additional carbon tetrachloride reacting with said oxychloride to form the chlorides of said refractory metal, withdrawing said gaseous mixture from said reaction zone, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride and withdrawing said gaseous mixture from said bed of sodium chloride and separating the pure refractory metal chloride from said gaseous mixture by condensing the pure metal chloride in a condensing zone maintained at a temperature of 140°–150° C.

13. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry, the amount of carbon tetrachloride being sufficient to entrain said particles upon vaporization of said slurry and forcing said slurry tangentially into one end of a reaction zone in the form of an annular space defined by two concentric cylindrical surfaces, said reaction zone being maintained at a temperature greater than 400° C., said slurry reacting at said temperature in said reaction zone to produce a gaseous mixture comprising the chloride and oxychloride of the refractory metal and impurities including spent ore fines, iron chloride and excess carbon tetrachloride, adding additional carbon tetrachloride into the end of said reaction zone opposite that at which said slurry enters, said added carbon tetrachloride reacting with said oxychloride to form the chloride of said refractory metal, withdrawing said gaseous mixture from said reaction zone, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride, withdrawing said gaseous mixture from said bed of sodium chloride, separating pure refractory metal chloride from said gaseous mixture by condensing the pure metal chloride in a first condensing zone maintained at a temperature of 140°–150° C., withdrawing said gaseous mixture from said first condensing zone and separating excess carbon tetrachloride from said gaseous mixture by condensing the excess carbon tetrachloride in a second condensing zone maintained at a temperature less than 76° C., recycling the excess carbon tetrachcloride and removing the gaseous mixture containing remaining impurities from the system.

14. A method of chlorinating oxide ores of a refractory metal selected from the group consisting of niobium, tantalum, molybdenum and tungsten comprising the steps of mixing particles of said ore of a size smaller than minus 100 U.S. standard mesh with liquid carbon tetrachloride to form a slurry, the amount of carbon tetrachloride being sufficient to entrain said particles upon vaporization of said slurry and forcing said slurry tangentially into one end of a reaction zone in the form of an annular space defined by two concentric cylindrical surfaces, said reaction zone being maintained at a temperature greater than 400° C., said slurry reacting at said temperature in said reaction zone to produce a gaseous mixture comprising the chloride and oxychloride of the refractory metal and impurities including spent ore fines, iron chloride, excess carbon tetrachloride and phosgene, adding additional carbon tetrachloride into the end of said reaction zone opposite that at which said slurry enters, said added carbon tetrachloride reacting with said oxychloride to form the chloride of said refractory metal, withdrawing said gaseous mixture from said reaction zone, separating spent ore fines from said gaseous mixture, passing said gaseous mixture through a bed of sodium chloride maintained at a temperature of at least 300° C. wherein said sodium chloride reacts with said iron chloride to form a liquid eutectic salt, withdrawing said liquid eutectic salt from said bed of sodium chloride, withdrawing said gaseous mixture from said bed of sodium chloride, separating pure refractory metal chloride from said gaseous mixture by condensing the pure metal chloride in a first condensing zone maintained at a temperature of 140°–150° C., withdrawing said gaseous mixture from said first condensing zone and separating excess carbon tetrachloride from said gaseous mixture by condensing the excess carbon tetrachloride in a second condensing zone maintained at a temperature less than 76° C., recycling the excess carbon tetrachloride, separating phosgene from the gaseous mixture by contacting the gaseous mixture with activated carbon to effect preferential adsorption of the phosgene by the activated carbon, subsequently removing phosgene from the carbon by washing the carbon with water and removing the gaseous mixture containing remaining impurities from the system.

15. The method of claim 14 wherein the additional carbon tetrachloride constitutes from about one-third to two-thirds the total amount of said carbon tetrachloride.

16. The method of claim 15 wherein said refractory metal is niobium.

17. The method of claim 14 wherein said activated carbon contains water vapor.

18. The method of claim 14 wherein the phosgene is separated from the gaseous mixture by the steps of passing the gaseous mixture through a chamber containing a mass of activated carbon containing water vapor wherein the gaseous mixture is contacted with said mass of activated carbon to effect preferential adsorption of the phosgene by the activated carbon and wherein the phosgene is subsequently removed from the carbon by flooding said chamber with water, thereby washing the mass of activated carbon.

References Cited by the Examiner

UNITED STATES PATENTS

| | | | |
|---|---|---|---|
| 2,354,383 | 7/1944 | Kiesskalt | 55—74 |
| 2,635,709 | 4/1953 | Archibold et al. | 55—74 |
| 2,720,447 | 10/1955 | Jones et al. | 23—285 |
| 2,773,898 | 12/1956 | Brinkmann et al. | 23—2.1 X |
| 2,789,880 | 4/1957 | Beaver | 23—16 |
| 2,859,097 | 11/1958 | Davidson et al. | |
| 2,905,545 | 9/1959 | Cookston | 23—87 X |
| 2,961,293 | 11/1960 | Newnham | 23—16 |
| 3,066,010 | 11/1962 | Horning et al. | 23—16 X |
| 3,066,015 | 11/1962 | Palmquist | 23—285 |
| 3,085,855 | 4/1963 | Sutherland et al. | 23—87 |
| 3,126,256 | 3/1964 | Haimsohn et al. | 23—205 |

OSCAR R. VERTIZ, *Primary Examiner.*

MAURICE A. BRINDISI, H. T. CARTER,
*Assistant Examiners.*